(12) United States Patent
Kalra et al.

(10) Patent No.: US 12,541,554 B2
(45) Date of Patent: Feb. 3, 2026

(54) TRANSCRIPT AGGREGATION FOR NON-LINEAR EDITORS

(71) Applicant: Adobe Inc., San Jose, CA (US)

(72) Inventors: Nikhil Kalra, San Jose, CA (US); Nico Alexander Becherer, Hamburg (DE)

(73) Assignee: ADOBE INC., San Jose, CA (US)

( * ) Notice: Subject to any disclaimer, the term of this patent is extended or adjusted under 35 U.S.C. 154(b) by 349 days.

(21) Appl. No.: 18/082,987

(22) Filed: Dec. 16, 2022

(65) Prior Publication Data
US 2024/0202239 A1 Jun. 20, 2024

(51) Int. Cl.
*G06F 16/683* (2019.01)
*G06F 16/65* (2019.01)

(52) U.S. Cl.
CPC .......... *G06F 16/685* (2019.01); *G06F 16/65* (2019.01)

(58) Field of Classification Search
CPC ....... G06F 16/68; G06F 16/683; G06F 16/686
USPC .......................................................... 700/94
See application file for complete search history.

(56) References Cited

U.S. PATENT DOCUMENTS

| | | | | |
|---|---|---|---|---|
| 11,347,379 B1* | 5/2022 | Levit | ............. | H04N 21/234336 |
| 11,463,507 B1* | 10/2022 | Levit | .................. | G06F 16/31 |
| 11,756,551 B2* | 9/2023 | Moritz | ............... | G10L 15/04 |
| | | | | 704/232 |
| 2005/0038661 A1* | 2/2005 | Momosaki | ........... | H04N 5/775 |
| | | | | 348/E5.122 |
| 2008/0219641 A1* | 9/2008 | Sandrew | ............ | G11B 27/105 |
| | | | | 386/E5.003 |
| 2011/0239107 A1* | 9/2011 | Phillips | ............ | G11B 27/034 |
| | | | | 704/E21.001 |
| 2015/0006540 A1* | 1/2015 | Martens | ............ | G11B 27/11 |
| | | | | 707/741 |
| 2015/0066503 A1* | 3/2015 | Achituv | ............. | G10L 15/197 |
| | | | | 704/235 |
| 2016/0352603 A1* | 12/2016 | VanAntwerp | ......... | H04L 65/70 |
| 2023/0260520 A1* | 8/2023 | Medalion | ............ | H04L 12/1831 |
| | | | | 704/232 |
| 2023/0260531 A1* | 8/2023 | Srivastava | ........... | G10L 21/028 |
| | | | | 704/233 |
| 2024/0202239 A1* | 6/2024 | Kalra | ..................... | G06F 16/65 |

OTHER PUBLICATIONS

Descript, "Descript Storyboard", Retrieved From Internet on Sep. 21, 2022 from URL: <https://www.descript.com/video-editing>, 8 Pages.

(Continued)

*Primary Examiner* — Alexander Krzystan
(74) *Attorney, Agent, or Firm* — Shook, Hardy & Bacon L.L.P.

(57) ABSTRACT

Systems, methods, and computer storage media are disclosed for transcript aggregation. In an example implementation, an audio mix processing map is generated representing an audio signal flow defined by a multi-track sequence that mixes audio sources arranged in audio tracks into a final mix. Using the audio mix processing map, an aggregated audio track is generated that represents which of the audio sources contribute to the final mix during which ranges of time. The aggregated audio track is transformed into an aggregated transcript track by associating transcript segments from transcripts of the audio sources with corresponding ranges of the ranges of time.

20 Claims, 9 Drawing Sheets

(56) References Cited

OTHER PUBLICATIONS

Descript Storyboard, "Descript Storyboard - The Future of Video Editing", Retrieved From Internet on Sep. 22, 2022 from URL: <https://www.descript.com/storyboard>, 9 Pages.

TypeStudio, "Online Video Editor", Retrieved From Internet on Sep. 22, 2022 from URL: <https://www.typestudio.co/tool/online-video-editor>, 9 pages.

Reduct Video, "Where your team and video work together", Retrieved From Internet on Sep. 21, 2022 from URL: <https://reduct.video/>, 10 Pages.

* cited by examiner

TRANSCRIPT AGGREGATION FOR NON-LINEAR EDITORS

BACKGROUND

Text based editing (TBE) is a new form of editing video footage that works by letting users edit a transcript of the spoken words, similar to how you would edit text in a text editor, as a proxy for applying edits to corresponding video segments of the video footage. TBE is gaining traction in the field of video editing, but existing solutions have focused on single track video editing, that is, rearranging or deleting parts of a linear video stream with no overlapping tracks (e.g. no multiple source video takes, no multilingual audio, etc.). While representing a linear single track timeline in the form of a transcript is a straight forward and simple operation, supporting transcript representations in a non-linear editor (NLE) like ADOBE® PREMIERE® Pro that can deal with multiple independent audio and video tracks requires a more sophisticated means of transcript aggregation.

SUMMARY

Certain embodiments are directed to generating an aggregated transcript for a multi-track sequence of audio sources, for example, on the fly (e.g., real-time, in response to edits). In an example implementation, audio sources (e.g., audio clips, audio from a video clip) are transcribed when they are imported into a NLE, and each transcript is used in any given multi-track sequence that the corresponding audio source is used in. A transcript aggregator reconciles an aggregated transcript for a given multi-track sequence by amalgamating the transcripts for each of the individual audio sources in the sequence using a series of rules to resolve conflicts during which multiple distinct pieces of audio overlap. In some embodiments, one or more metadata side channels to the audio tracks store a time-dependent representation (e.g., an audio mix processing map, such as a directed graph) of an audio signal flow defined by the multi-track sequence. In response to edits, the time-dependent representation is updated, queried, and evaluated using a series of pre-defined contribution tracking rules to determine which audio sources contribute to the final mix during which time ranges of the timeline. As such, the transcript aggregator uses these time ranges to retrieve and insert corresponding transcript segments from the transcripts of corresponding audio sources into the aggregated transcript. As a result, the aggregated transcript effectively serves as a proxy for the spoken dialog that can be heard on the main output of the multi-track sequence after routing and mixing (the final mix).

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
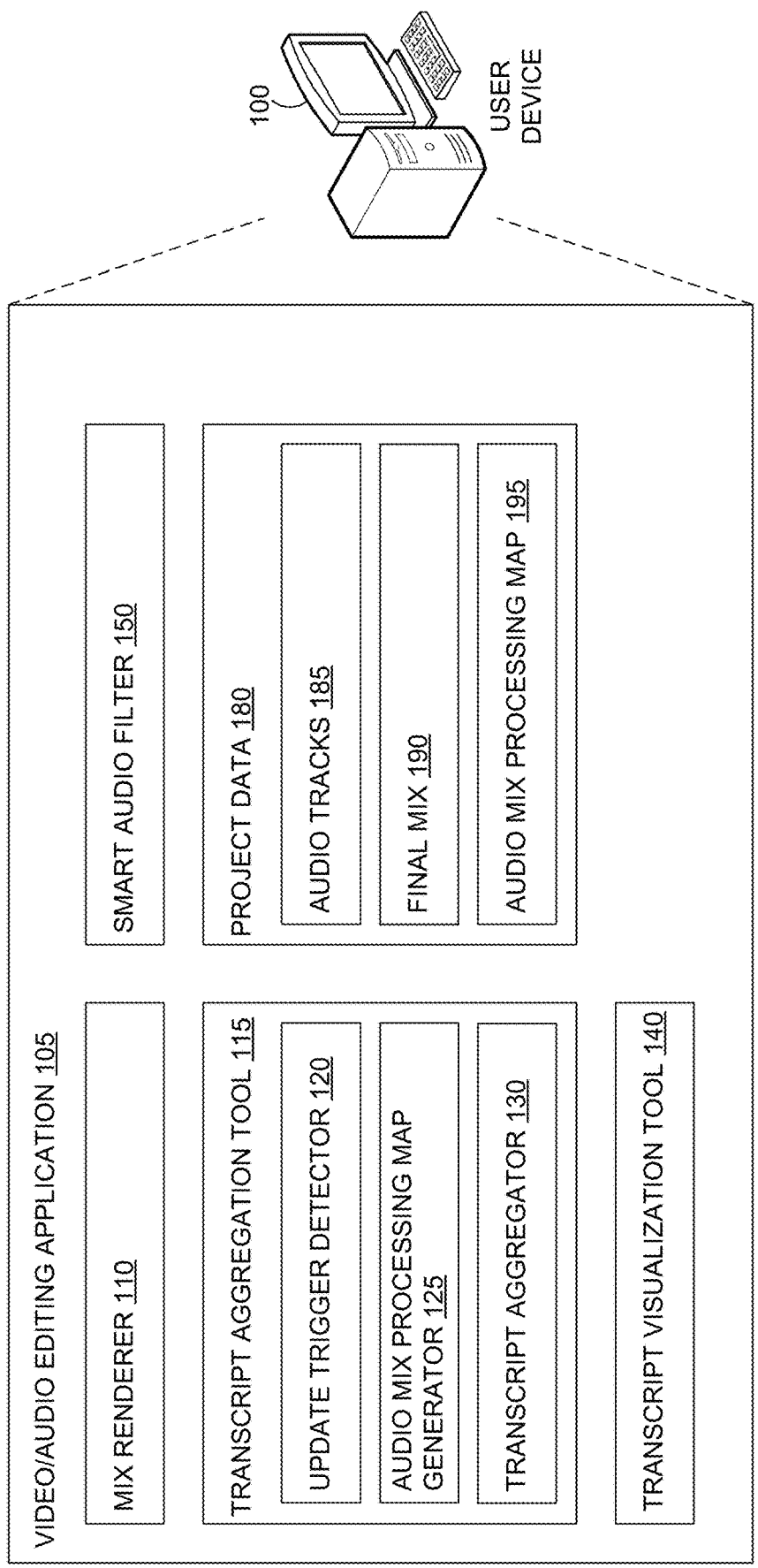
FIG. 1 is a block diagram of an example computing system suitable for generating an aggregated transcript, in accordance with certain embodiments.

A video file, clip, or project can usually be split up into visual and audio elements. For example, a video might encode or otherwise identify a video track comprising a sequence of still images (e.g., video frames) and an accompanying audio track comprising one or more audio signals. Video and audio editing interfaces often provide a timeline on which users can arrange a sequence of video and/or audio clips that are represented on corresponding ranges of the timeline.

Generating a transcript for a single track timeline is relatively straightforward. A single audio track intrinsically serializes the audio onto a consistent stream, which can be mapped to a transcript with timecodes, and the appropriate transcript text can be displayed for each clip. One existing technique features a single-track timeline for audio and offers a relatively primitive version of text-based editing: it transcribes the audio track and offers a text-editor-like interface that enables users to make edits to their timeline as if it were a text document. In terms of providing a dynamic transcript to their users, this existing technique is relatively simple: transcribe each of the clips on the audio track, and append their transcripts together to make a text document. When the user edits the text document, the transcript is updated to show the text from the clips on the audio track. There is no reconciliation or aggregation required to deal with overlapped ranges because there are no overlapping clips on the audio track. For NLEs that permit multiple independent audio and video tracks with overlapping clips and gaps between clips in a track, the challenge becomes how to serialize multiple audio streams onto a single stream in a consistent, reproducible, and sensible manner.

Depending on the use case for which support is desired, transcript aggregation can take on varying degrees of complexity. A simple solution might be to merge the transcripts for all of the audible sources together, but this solution would not address how to handle overlapping audio segments. Another solution might be to merge the transcripts together, prioritizing the top-most or bottom-most audio track for an overlapped range. While this may address overlapped segments, it would not support some of the more complex edits that NLE users regularly work with, such as those in which multiple audio tracks are layered or keyframed to filter or otherwise edit spoken words during a given time range.

Furthermore, a challenge arises in dealing with sequences where the editing has not been completed. Transcribing sources and fixed sequences where the editing is completed is relatively manageable: render out a specific audio track, track items, or a mixdown, and transcribe its contents. However, with sequences that are subject to further editing, any given edit can invalidate the transcript. There are a few possible approaches to transcribing sequences that are subject to further editing. One option is to re-transcribe the entire sequence every time there is an edit. However, this option is slow, resource intensive, and expensive: if you have a 60 minute sequence, this means re-transcribing 60 minutes worth of content every time there is an edit. Another option is to segment the sequence and re-transcribe only the segment for the portion of the sequence in which there was an edit. This option is more efficient than the first because only the delta is re-transcribed, but it has the potential to become extremely expensive. Even though only the segment that changed is re-transcribed, that segment will typically also contain content that has not changed, incurring a non-essential cost (both time-wise and computationally) to re-process that portion of the segment. Furthermore, the fact that a segment has been edited does not guarantee the presence of spoken voice in that segment, or that the user does not have sound effects or other audio that interfere with the transcription. As such, there is a need for improved techniques for generating a transcript for a multi-track sequence of audio sources.

Accordingly, the present disclosure describes various techniques for generating an aggregated transcript for a multi-track sequence of audio sources, for example, on the fly (e.g., real-time, in response to edits). In an example implementation, audio sources (e.g., audio clips, audio from a video clip) are initially transcribed when they are imported into a NLE (or some other time such as after relinking, or once project or sequence permissions are modified and write access is no longer limited, such as in a multi-user Productions or Team Projects type scenario), and each transcript is used in any given multi-track sequence that the corresponding audio source is used in. A transcript aggregator reconciles an aggregated transcript for a given multi-track sequence by amalgamating the transcripts for each of the individual audio sources in the sequence using a series of rules to resolve conflicts during which multiple distinct pieces of audio overlap. In some embodiments, one or more metadata side channels to the audio tracks store a time-dependent representation (e.g., an audio mix processing map, such as a directed graph) of an audio signal flow defined by the multi-track sequence. In response to edits, the time-dependent representation is updated, queried, and evaluated using a series of pre-defined contribution tracking rules to determine which audio sources contribute to the final mix during which time ranges of the timeline. As such, the transcript aggregator uses these time ranges to retrieve and insert corresponding transcript segments from the transcripts of corresponding audio sources into the aggregated transcript. As a result, the aggregated transcript effectively serves as a proxy for the spoken dialog that can be heard on the main output of the multi-track sequence after routing and mixing (the final mix).

In some embodiments, to support transcript aggregation and other workflows, an NLE supports a metadata side channel alongside each transcribed audio track, and the metadata side channel can carry arbitrary information that the transcript aggregator uses to help determine whether or not the transcript segments for the given audio segment should be fully or partially factored into the aggregated transcript. In an example implementation, the metadata side channel is evaluated when an edit has been made to an audio track represented by the metadata side channel, when an edit is made to one the audio sources in the audio track, and/or when the transcript aggregator determines that an edit contributes an update to the aggregated transcript. In some embodiments, one or more metadata side channels store a representation of the audio signal flow defined by a multi-track sequence (e.g., from audio source, through edits and mixing), such as an audio mix processing map. In an example implementation, the audio mix processing map is a time-dependent representation of the audio sources that are present in an audio track and/or in the multi-track sequence, their corresponding audio characteristics (e.g., volume, intensity, power), applicable edits (e.g., cuts, volume automation, filters, effects, distortions, or other defined modifications to an audio source, whether time-deterministic, or non-time deterministic such as those defined by filters or intrinsics that modify the raw audio stream at the clip node level), and/or the manner in which they are mixed into an output audio track (e.g., track levels).

In some such embodiments, the audio mix processing map takes the form of a time-dependent directed graph, where at any given time on a timeline defined by a multi-track sequence, the graph includes a clip node that represents each audio clip present in an audio track at that time, followed by an edit node for each audio edit applied to the audio clip. The node chain representing each audio track at a given time is fed into a mix node that represents the audio track processing that mixes each of the audio tracks into the final output. Each clip and edit node stores or identifies a representation of how the volume (and/or other audio characteristics, such as noise or distortion) of a corresponding audio clip changes over time (e.g., a map of time vs. volume, an array that stores volume level as a function of time). The mix node stores or identifies a representation of one or more transformations to the audio signal (e.g., mix levels) represented by the output of each clip/edit node that is fed into the mix node. As such, the audio mix processing map can be queried for nodes that represent audio sources, edits, levels, and/or other metadata defined by a multi-track sequence at any given time of the timeline of the multi-track sequence.

In some embodiments, the transcript aggregator determines whether an audio source in a given audio track contributes to a final mix, and/or which of multiple overlapping audio sources from multiple audio tracks contributes to a final mix, by evaluating one or more metadata side channels (e.g., an audio mix processing map stored therein) via a series of (e.g., pre-defined, configurable) contribution tracking rules, including but not limited to rules that factor in audio volume, audio classification (e.g., dialogue, music, etc.), audio automation (e.g. filtering out specific words), and/or other audio track or track item metadata. In some implementations, the order in which each metadata side channel is evaluated is defined via a series of (e.g., pre-defined, configurable) contribution tracking rules, including but not limited to rules that factor in track order in the NLE, static track metadata associated with the track (e.g., mute, solo), dynamic track metadata associated with the track (e.g., volume, automation), and/or other types. By evaluating a metadata side channel for an audio track, the transcript aggregator can analyze complex layered audio edits and determine that certain words in a transcript of a particular audio source should not make it into the aggregated transcript. For example, in some embodiments, the transcript aggregator queries the metadata side channel, determines that a retrieved node defines a signal level for an audio source in a corresponding audio track that falls below some threshold during a particular duration of time (e.g., based on metadata stored or otherwise identified by the node, such as audio automation, volume, mute or solo status, gain, effects, etc.), and excludes transcript text for that audio source during the time range in which the signal level falls below the threshold.

In some embodiments, the transcript aggregator generates an aggregated audio track that represents which audio sources contribute to the final mix during which time ranges, and transforms the aggregated audio track into an aggregated transcript by retrieving transcript segments from the appropriate audio source defined for each time range by the aggregated audio track. Depending on the implementation, the aggregated transcript is used in various ways. In one example, the aggregated transcript is presented in a window, panel, interface, or other region of an NLE and updated in real-time as edits are made to the audio sources in the multi-track sequence. In this sense, the aggregated transcript can be thought of as a living transcript that flows and changes as the user edits the multi-track sequence. In some embodiments, the aggregated transcript is used in a TBE that accepts transcript edits and performs corresponding audio (and/or video) edits. Additionally or alternatively, keyword searches are performed on the aggregated transcript to surface audio sources (e.g., audio or video clips) based on words or phrases that are spoken in them. These are just a few examples, and other use cases are contemplated within the scope of the present disclosure.

The techniques described herein result in various improvements over conventional techniques. Initially, unlike prior techniques, the present techniques enable generation of a transcript that accurately represents words spoken in a final mix that includes multiple audio sources and potentially complex edits defined by a multi-track sequence. Furthermore, embodiments that transcribe (or load previously generated transcripts for) audio sources when they are imported, and leverage these existing transcripts to generate an aggregated transcript, dramatically minimize cost (time and computationally) over techniques that re-transcribe. Moreover, in embodiments that consider the presence of audio edits applied to an audio source in generating an aggregated transcript, the transcript aggregator does not use pure audio data alone to generate a transcript, but rather, uses audio data (e.g., a previously generated transcript of the audio source), in conjunction with a representation of an applicable edit defined by a multi-track sequence in an NLE, to generate a more accurate transcript than prior techniques. Finally, a rule-based approach in which accompanying metadata describing how each audio track and audio segment is used facilitates a predictable transcript that an NLE user can more easily work with than with prior techniques in which audio tracks or segments are consolidated in isolation.

Example Transcript Aggregation Environment

Referring now to FIG. 1, a block diagram of an example computing system suitable for use in implementing embodiments of the invention is shown. Generally, the computing system represented by FIG. 1 is suitable for transcript aggregation, and, depending on the implementation, facilitates TBE.

At a high level, FIG. 1 includes client device 100. Depending on the embodiment, client device 100 is any kind of computing device capable of facilitating transcript aggregation. For example, in an embodiment, client device 100 is a computing device such as computing device 900, as described below with reference to FIG. 9. In some embodiments, client device 100 a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, client device 100 and/or other components that are not illustrated in FIG. 1 include computer storage media that stores information including data, data structures, computer instructions (e.g., software program instructions, routines, or services), and/or models (e.g., 3D models, machine learning models) used in some embodiments of the technologies described herein. For example, in some implementations, client device 100 comprises a data store (or computer data memory) that stores project data 180. Further, although client device 100 is depicted as a single component in FIG. 1, in some embodiments, client device 100 is implemented using any number of data stores (e.g., using local and/or cloud storage), and/or any data or components described herein are stored on any suitable data store(s) and any suitable device(s).

In an example embodiment, client device 100 is in communication with one or more computing devices such as a server (not shown in FIG. 1) via a network. In some non-limiting example implementations, the network includes one or more local area networks (LANs) and/or wide area networks (WANs). Such networking environments are commonplace in offices, enterprise-wide computer networks, intranets, and the Internet.

In the example illustrated in FIG. 1, client device 100 includes video/audio editing application 105 with transcript aggregation tool 115. In some embodiments, transcript aggregation tool 115 and/or any of the elements illustrated in FIG. 1 are incorporated, or integrated, into an application(s), or an add-on(s) or plug-in(s) to an application(s), such as video/audio editing application 105. In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). Example applications includes include any type of video and/or audio editor, such as Adobe Premiere or AFTER EFFECTS®, to name a few examples. Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, transcript aggregation tool 115 and other components (or some portion thereof) are integrated into an application (e.g., video/audio editing application 105) executable on a single device. In another example, one or more components of video/audio editing application 105 are distributed across some other number and/or type(s) of devices (e.g., hosted on a server) and coordinate via a network to execute the functionality described herein. These are just examples, and any suitable allocation of functionality among these or other devices is possible within the scope of the present disclosure.

To begin with a high-level overview of an example workflow through the configuration illustrated in FIG. 1, client device 100 is a desktop, laptop, or mobile device such as a tablet or smart phone, and video/audio editing application 105 provides one or more user interfaces. In some embodiments, video/audio editing application 105 accepts input creating or loading a video or audio editing project that identifies a multi-track sequence through, and/or otherwise accepts input identifying a location where a video or audio editing project is stored (whether local to client device 100, at some remote location). Video/audio editing application 105 includes an interface that presents a multi-track timeline that visually represents and accepts input configuring a multi-track sequence of track items (e.g., video and/or audio sources), editing track items (e.g., cut, copy, paste, trim, add effects), specifying track and/or mix levels, and/or other known multi-track sequence configuration/editing functionality. In the example in FIG. 1, video/audio editing application 105 includes mix renderer 110 that uses track and/or track item metadata representing various track and/or track item characteristics (e.g., duration, intensity, power, volume) to merge track items from each track (e.g., audio sources form audio tracks 185) into a rendered mix (e.g., final mix 190, such as a video or audio file) that can be played back in an interface of video/audio editing application 105, saved, exported, and/or otherwise stored or manipulated.

In the implementation illustrated in FIG. 1, video/audio editing application 105 includes transcript aggregation tool 115 that generates an aggregated transcript that represents the words that are spoken in final mix 190. In this example, transcript aggregation tool 115 includes update trigger detector 120, audio mix processing map generator 125, and transcript aggregator 130. At a high level, update trigger detector 120 detects certain triggering events (e.g., creating a new project, editing a track item or audio track item, duplicating a multi-track sequence within a project), and triggers audio mix processing map generator 125 to generate (e.g., a new or updated version of) audio mix processing map 195 (e.g., a directed graph) that represents the audio signal flow defined by the video or audio editing project (e.g., audio tracks 185 of a multi-track sequence defined therein) as a function of time (position on the timeline represented by the multi-track sequence). Upon generating (or updating) audio mix processing map 195 to reflect the current state of a multi-track sequence, transcript aggregator 130 generates (e.g., a new or updated version of) an aggregated transcript using audio mix processing map 195.

Figure 2:
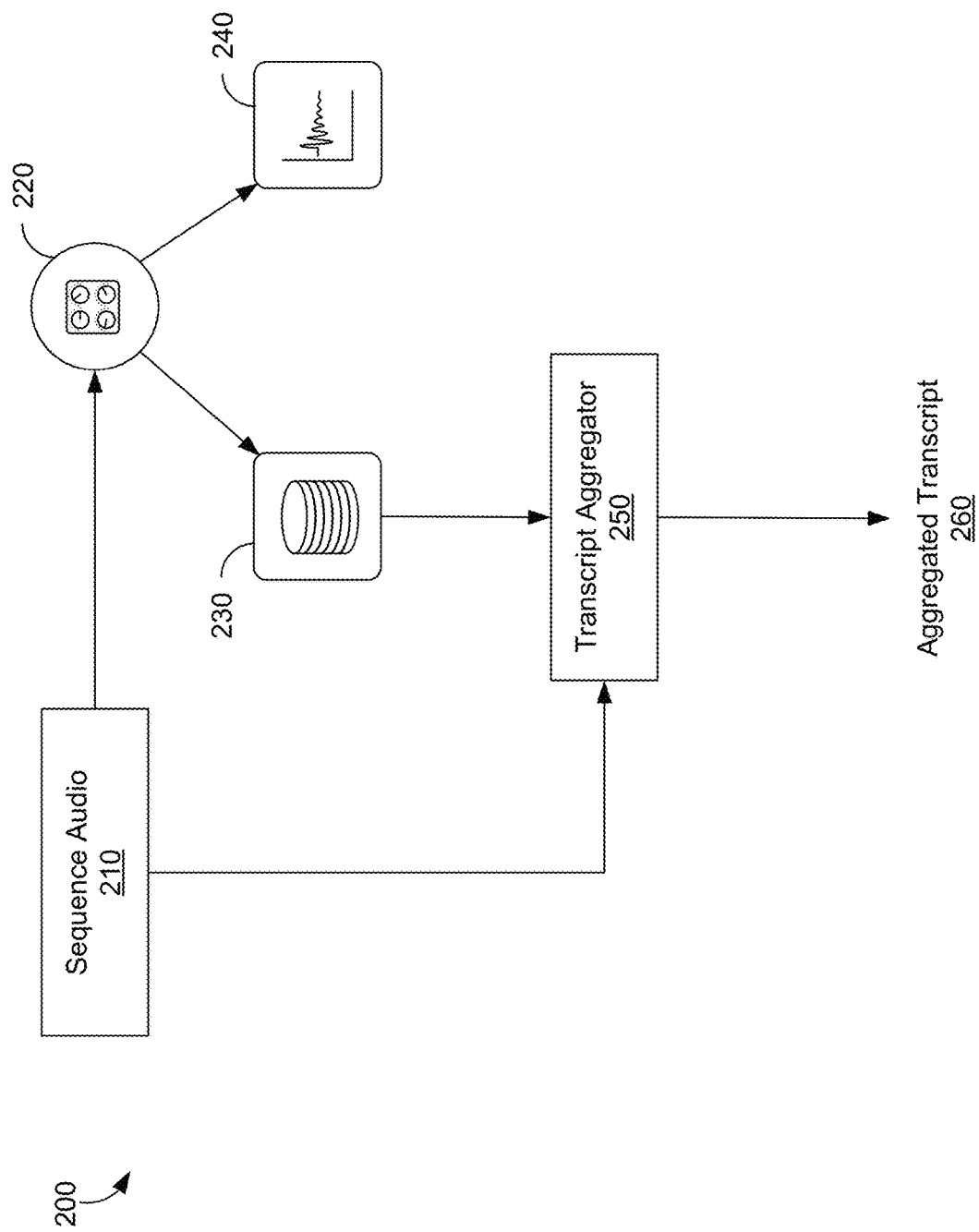
FIG. 2 is a data flow diagram that illustrates an example transcript aggregation technique, in accordance with certain embodiments.

By way of illustration, FIG. 2 is a data flow diagram that illustrates an example transcript aggregation technique, in accordance with certain embodiments. In this example, sequence audio 210 (e.g., an arrangement of any number of audio sources in any number overlapping audio tracks) flows into mixer 220 (e.g., which in some embodiments corresponds to mix renderer 110 of FIG. 1). In this example, mixer 220 renders and outputs a merged representation of sequence audio 210 (merged audio signal 240) (e.g., an audio or video file) using any known technique, and outputs a representation of how much each audio source in sequence audio 210 contributed to merged audio signal 240 (audio mix processing map 230, which in some embodiments corresponds to audio mix processing map 195 of FIG. 1). In the example illustrated in FIG. 2, transcript aggregator 250 uses audio mix processing map 230 and the structure of the corresponding audio tracks (e.g., represented in audio mix processing map 230, in the audio tracks or project file, etc.) to generate aggregated transcript 260.

Note FIG. 2 illustrates an example in which mixer 220 renders merged audio signal 240, and audio mix processing map 230 is generated during the audio rendering process, but this need not be the case. More specifically, some embodiments generate audio mix processing map 230 independent of the audio rendering process and/or without rendering merged audio signal 240.

Figure 3:
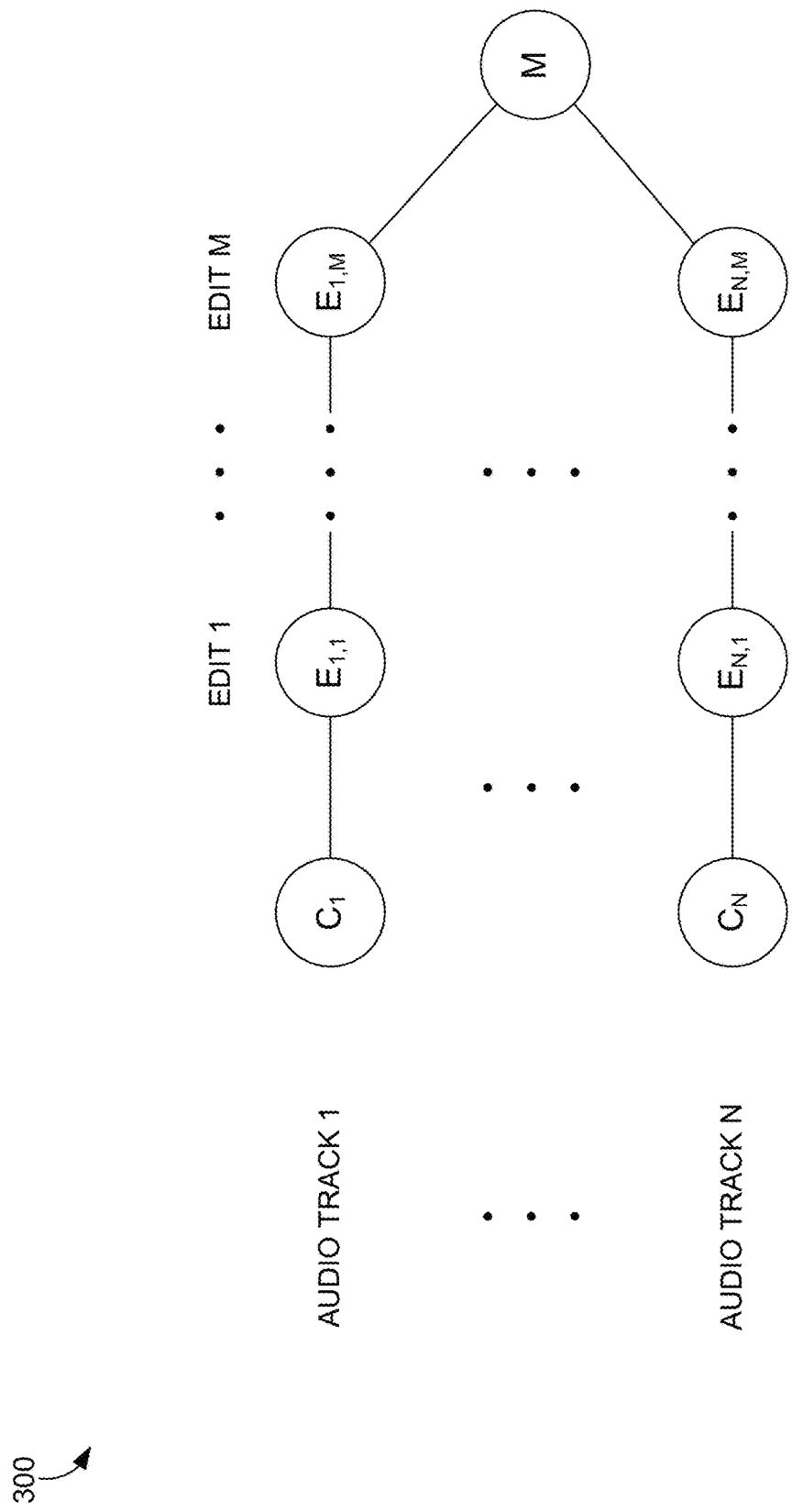
FIG. 3 is an example audio mix processing map, in accordance with certain embodiments.

FIG. 3 is an example audio mix processing map 300, in accordance with certain embodiments. In this example, audio mix processing map 300 represents N overlapping clips present in N audio tracks at a particular point of time in a multi-track sequence. More specifically, audio mix processing map 300 includes clip nodes $C_1 \ldots C_N$ representing the different overlapping clips. Each clip node includes edit nodes $E_1 \ldots E_M$ representing the different edits (e.g., including filters or effects) defined by the multi-track sequence for the clip represented by a corresponding clip node. A clip node and its edit nodes form a node chain, and each node chain feeds into a mix node M that represents one or more transformations applied to the signal from each track in mixing the tracks together. Depending on the implementation, any given node stores or identifies corresponding audio metadata in any suitable fashion (e.g., each node stores or identifies an array with different entries or dimensions that each store or identify values of different types of metadata). In an example embodiment, each clip node stores or identifies a map that represents duration vs. volume. In some embodiments, there are different classes of edit nodes to represent different types of edits (and corresponding metadata). In an example embodiment, audio automation is represented with an edit node that takes in a preceding audio signal (e.g., a clip node represented by a map of duration vs. volume) and stores or identifies a map of keyframes vs. volume. The output of the edit node is fed into subsequent edit nodes (if applicable), and so on until arriving at the output of the mix node (representing the final rendered audio mix). In some embodiments when there are multiple simultaneous streams of audio (e.g., overlapping audio track items), the mix node takes in the multiple inputs and represents how those streams mix together. Note that audio mix processing map 300 represents clips (and edits) that are present a particular time on the multi-track sequence, so at other times when other clips (or edits) are present, the (relevant portion of the) audio mix processing map will differ. Depending on the implementation, the audio mix processing map could be considered to be the graph that represents a particular time, some combined representation of the different graphs for different times, and/or some portion thereof. The foregoing configuration is meant simply as an example, and other ways of representing an audio signal flow are contemplated within the scope of the present disclosure.

Figure 4:
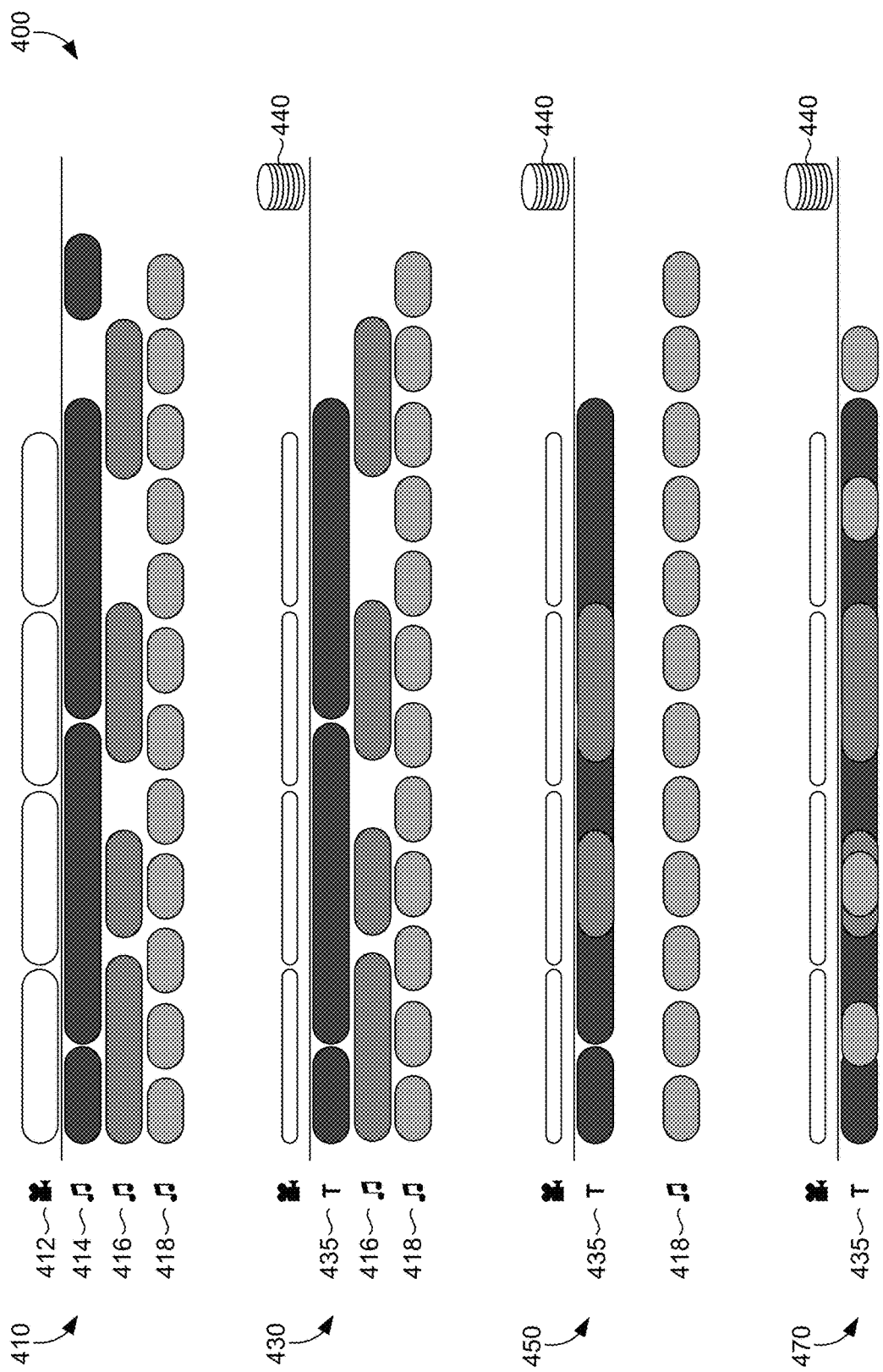
FIG. 4 illustrates a multi-track sequence and an aggregated transcript track generated from the multi-track sequence over multiple iterations, in accordance with certain embodiments.

FIG. 4 illustrates a multi-track sequence and an aggregated transcript track generated from the multi-track sequence over multiple iterations, in accordance with certain embodiments. More specifically, multi-track sequence 410 represents a sequence of video and audio sources (e.g., clips) arranged in visual track 412 and audio tracks 414, 416, and 418. In some embodiments, when a particular audio source is added to multi-track sequence 410, the audio source is transcribed using any known voice-to-text technique. At a high level, a transcript aggregator (e.g., transcript aggregator 130 of FIG. 1 and/or transcript aggregator 250 of FIG. 2) algorithmically reconciles audio tracks 414, 416, and 418 into a single aggregated transcript track by iterating over audio tracks 414, 416, and 418 and applying one or more pre-determined and/or configurable contribution tracking rules to generate an aggregated audio track, and transforming the aggregated audio track into an aggregated transcript track by retrieving and inserting segments of transcript text from corresponding transcripts into the aggregated audio track (or some other suitable representation). Multi-track sequences 430, 450, and 470 illustrate the state of aggregated audio track 435 after different iterations.

To facilitate transcript aggregation, in an example embodiment, each track in multi-track sequence 410 is represented using one or more data structures (e.g., a linked list of track items, where each entry in a link listed for a particular track represents a particular track item and associated track item metadata representing various track and/or track item characteristics such as duration, start time, end time, intensity, power, volume, and/or other characteristics). In some embodiments, a representation of multi-track sequence 410 (e.g., N linked lists representing N audio tracks) is duplicated to create a shadow sequence that can be manipulated in generating an aggregated audio track and/or an aggregated transcript without impacting multi-track sequence 410 itself.

In some embodiments, one or more iterations of transcript aggregation (e.g., a single pass or multiple passes) apply one or more pre-determined and/or configurable contribution tracking rules that determine whether to include an audio source (or a segment thereof) in an aggregated audio track and/or an aggregated transcript based on a measure of whether it contributes (e.g., is expected to contribute) to a final audio mix. In an example embodiment, an iteration involves identifying active audio tracks (e.g., tracks that are not muted or deactivated by virtue of another track being soloed), traversing the timeline represented by multi-track sequence 410 (e.g., a linked list representing each active audio track), and for each time, querying one or more metadata side channels to retrieve a representation of the applicable track items, edits, and corresponding metadata applicable at that time. In some embodiments, querying one or more metadata side channels for a particular point in time on the timeline returns an audio mix processing map (e.g., a graph and/or corresponding nodes) that represent(s) each track item and/or each edit defined by multi-track sequence 410 at that particular point on the timeline. As a result, the transcript aggregator evaluates the retrieved metadata (e.g., inspecting each node in a node chain representing a sequence of edits applied to a particular track item, inspecting a mix node representing one or more transformations applied in mixing the track item into the final fix) against one or more pre-determined and/or configurable contribution tracking rules to determine whether a particular track item contributed to the final mix. If so, the transcript aggregator includes the track item in aggregated audio track 435. As such, in some embodiments, the transcript aggregator iterates through nodes in a node chain, evaluating corresponding metadata.

Depending on the embodiment, any number and type of contribution tracking rule is applied, and at any suitable point during the process. In some embodiments, a contribution tracking rule is evaluated against static track metadata (e.g. audio mute, etc.) or dynamic track metadata (e.g. track volume automation) sourced from the metadata side channel. Example contribution tracking rules operate on track and/or track item metadata such as track mute status (e.g., ignore all audio on muted track), track item volume (e.g., ignore audio track items with volume below a threshold), track item gain (e.g., ignore audio track items with a threshold gain), track volume automation (e.g., ignore audio track ranges with a volume below a threshold), track item audio classification (e.g., ignore audio classified by a machine-learning model audio classifier as a sound effect or background music), track routing (e.g., ignore dialogue exclusive to rear speakers in a surround sound setup), track position in multi-track sequence 410 (e.g., resolve conflicts by prioritizing audio tracks that appear higher in multi-track sequence 410), track solo status (e.g., ignore other tracks), and/or other types. In some embodiments, third party effects are added to multi-track sequence 410 (e.g., the designer of the effect is not the same entity that designed the video/audio editing application being used). Since third party effects do not always expose the type of effect to the video/audio editing application, it is possible that some type of denoising or distortion was applied to an audio track that includes speech. As such, some embodiments evaluate gain reduction applied by an effect (e.g., ignore track or track item that includes an effect that reduces gain more than a threshold amount). These are just a few example, and other types of contribution tracking rules are contemplated within the scope of the present disclosure.

For example, consider an audio clip containing profanity. When transcribed, the transcript for this audio clip will contain profanity. However, assume that when a user adds this audio clip to a multi-track sequence, they censor the profanity by applying track volume automation over the portions of the audio clip that include the profanity (e.g., lowering the volume during those words). If the raw transcript for that audio clip was attached to the aggregated transcript without evaluating track volume automation, the aggregated transcript would include profanity even though the final mix does not. By contrast, some embodiments evaluate a metadata side channel that represents the track volume automation to determine specific time ranges during which the audio clip actually contributes to the final mix (e.g., ranges in which the resulting volume is above a threshold). As a result, the time ranges during which the audio clip does not contribute to the final mix are effectively filtered out (e.g., of the aggregated audio track and/or the aggregated transcript track), for example, by including in aggregated audio track (and/or the aggregated transcript track) only those segments of the audio clip (and/or its corresponding transcript) where the volume of the audio clip was above the threshold.

As another example, consider a scenario in which a user employs a spoken audio track (e.g., a voice track), but edits the track so that only certain ranges are audible in the final mix. As such, some embodiments evaluate a metadata side channel to retrieve a representation of the audio routing and/or gain levels (e.g., through a sequence of edits), evaluate portions of the track (e.g., audio sources in the track) down to the sample level, and/or determine whether or not the those portions contribute a significant signal (e.g., over a designated threshold) to the final mix, and as a result, determine what ranges of what audio sources to add to the aggregated audio track and/or what transcript segments to add to the aggregated transcript.

FIG. 4 illustrates an example in which retrieved metadata for audio tracks 414, 416, and 418 of multi-track sequence 410 is iteratively evaluated to generate and update aggregated audio track 435 with each successive iteration. During a first iteration, a transcript aggregator evaluates a first audio track (e.g., audio track 414) for inclusion in aggregated audio track 435 by evaluating the track's metadata (e.g., represented in one or more audio mix processing maps 440) against one or more contribution tracking rules (e.g., static and/or dynamic track and/or track item metadata). In this example, the transcript aggregator determined that all the track items (e.g., audio sources) from audio track 414 contribute to the final mix except for the last track item. As such, multi-track sequence 430 (which represents aggregated audio track 435 after the first iteration) is illustrated with aggregated audio track 435 in a state that includes all the audio sources from audio track 414 except for the last track item.

During a second iteration, the transcript aggregator evaluates a second audio track (e.g., audio track 416) for inclusion in aggregated audio track 435 by evaluating the track's metadata (e.g., represented in one or more audio mix processing maps 440) against one or more contribution tracking rules (e.g., static and/or dynamic track and/or track item metadata). Each track item determined to contribute to the final mix is reconciled into aggregated audio track 435. For example, if there is no overlap between a contributing track item from audio track 416 and an existing track item in aggregated audio track 435, the contributing track item is added to aggregated audio track 435. If there is an overlap, the transcript aggregator retrieves metadata for each of the overlapping contributing track items (e.g., via one or more corresponding metadata channels), and applies one or more contribution tracking rules that govern conflicts (e.g., prioritizing track position, higher volume or gain levels, etc.). As such, the transcript aggregator resolves the conflict and determines which track item (or portion thereof) is considered to contribute to the final mix. Depending on the outcome, the track item from audio track 416 is dropped, the track item from audio track 416 is added to aggregated audio track 435 by overwriting a corresponding portion of aggregated audio track 435, and/or some portion of the track item from audio track 416 is added to aggregated audio track 435 by overwriting a corresponding portion of aggregated audio track 435. As illustrated in FIG. 4, multi-track sequence 450 (which represents aggregated audio track 435 after the second iteration) is illustrated with aggregated audio track 435 in a state that includes the second and third audio sources from audio track 416.

In a third (and subsequent iterations for further audio tracks), the transcript aggregator evaluates a third audio track (e.g., audio track 418) for inclusion in aggregated audio track 435 by evaluating the track's metadata (e.g., represented in one or more audio mix processing maps 440) against one or more contribution tracking rules (e.g., static and/or dynamic track and/or track item metadata). In this example, multi-track sequence 470 (which represents aggregated audio track 435 after the third iteration) is illustrated with aggregated audio track 435 in a state that includes the second, fourth, ninth, and eleventh audio sources from audio track 418. Depending on the embodiment and the number of audio tracks, this process is repeated until there are no longer any remaining audio tracks (e.g., overlapping track items from the individual audio tracks).

Note that the example illustrated in FIG. 4 involves multiple iterations where each iteration reconciles one audio track into aggregated audio track 435, however, this need not be the case. For example, some embodiments iterate through all audio tracks evaluating their relative contributions by applying contribution tracking rules to corresponding metadata during a single pass of a multi-track sequence, as will be understood by those skilled in computer science with a specialty in data structures and algorithms.

As such, the transcript aggregator generates aggregated audio track 435, which represents which track items from multiple audio tracks contribute to the final mix. This process of generating an aggregated transcript can be understood as flattening the underlying audio tracks (audio tracks 414, 416, 418) into aggregated audio track 435. In some embodiments, the transcript aggregator transforms aggregated audio track 435 into a corresponding aggregated transcript, for example, by traversing the aggregated audio track 435, and for each track item, identifying its range on the timeline, retrieving a corresponding segment of the transcript for that track item, and adding the transcript segment to an aggregated transcript.

As such, and returning to FIG. 1, transcript aggregation tool 115 generates an aggregated transcript, which can be used in various ways. In some embodiments, transcript visualization tool 140 presents the aggregated transcript in a window, panel, interface, or other region of an interface presented by video/audio editing application 105, and/or transcript aggregation tool 115 updates the aggregated transcript in real-time as edits are made to the audio sources in the multi-track sequence. In this sense, the aggregated transcript can be thought of as a living transcript that flows and changes as the user edits the multi-track sequence. In some embodiments, the interface in which the aggregated transcript is presented is part of a TBE that interprets transcript edits (e.g., selecting and interacting with text segments) as instructions to perform corresponding audio (and/or video) edits. Additionally or alternatively, smart audio filter 150 accepts a keyword search query and performs a keyword search on the aggregated transcript to surface audio sources based on matching words or phrases that appear in the aggregated transcript and that come from those audio sources. These are just a few examples, and other use cases are contemplated within the scope of the present disclosure.

Although some embodiments focus on transcript aggregation, some embodiments evaluate one or more metadata side channels to determine which audio track items contribute an audio signal to a final mix, and apply some other workflow that uses those contributing audio track (e.g., applying some type of audio processing to only those audio track items that contribute to the final mix). In an example embodiment, a metadata side channel is used as an input for a "smart" audio adjustment layer that defines an audio effect or other modification to be applied to an entire multi-track sequence (or a portion thereof), instead of to individual track items. In some such embodiments, one or more metadata side channels are used to influence how that adjustment layer is applied and how any generated modifications are applied to the individual track items under the adjustment layer or to the final mix for the region spanned by the adjustment layer. By way of non-limiting example, some embodiments generate an aggregated audio track that represents the contributing audio track items, and use the aggregated audio track to determine which audio track items and/or corresponding ranges in which to apply the edit defined by the adjustment layer. This is meant simply as an example, and other workflows that make use of a metadata side channel and/or an aggregated audio track that represent contributing audio track items are contemplated within the scope of the present disclosure.

Example Flow Diagrams

With reference now to FIGS. 5-8, flow diagrams are provided illustrating various methods. Each block of the methods 500-800 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Figure 5:
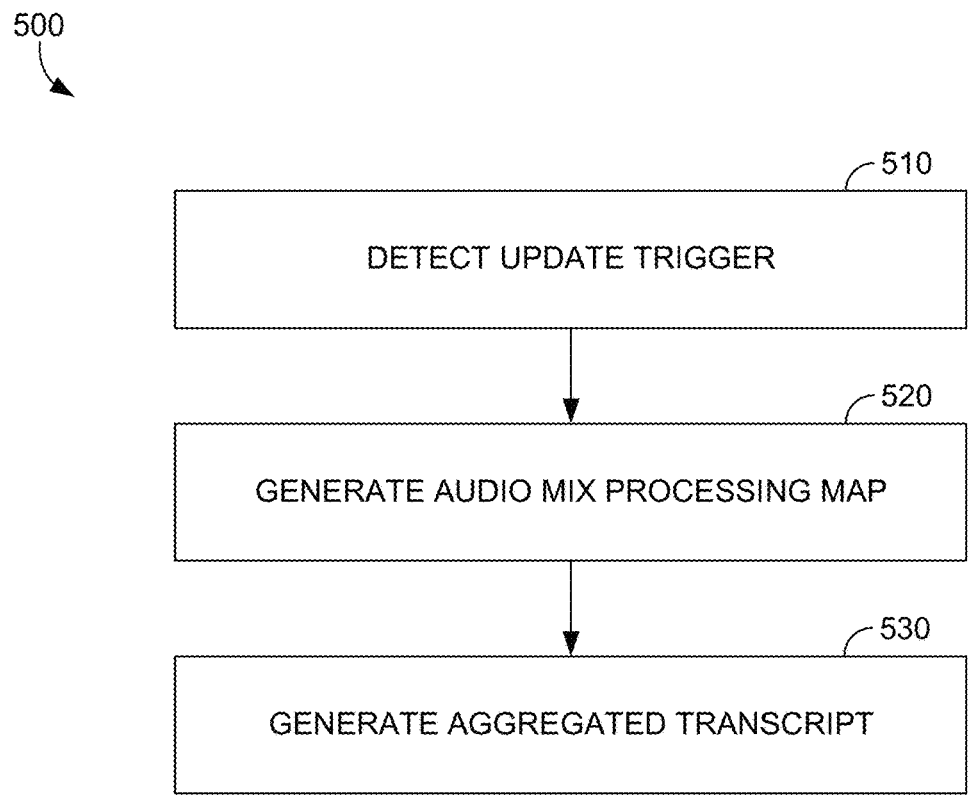
FIG. 5 is a flow diagram showing a method for triggering generation of an aggregated transcript, in accordance with certain embodiments.

Turning initially to FIG. 5, FIG. 5 illustrates a method 500 for triggering generation of an aggregated transcript, in accordance with embodiments. Initially at block 510, a processing device implementing the present disclosure detects an update trigger (e.g., predefined and/or configurable triggering events, such as creation of a new project, a received or applied edit to a track item or audio track item, duplication of a multi-track sequence within a project). In some embodiments, a determination is made whether or not a triggering edit impacts an aggregated transcript, and if not (e.g., if a determination is made that the edit is to a track or track item that does not contribute, based on application of one or more contribution tracking rules), method 500 terminates. At block 520, the processing device generates (e.g., a new or updated version of) an audio mix processing map, for example, in response to detecting the triggering update. In some embodiments, the audio mix processing map (e.g., is a directed graph that) represents the audio signal flow defined by the video or audio editing project as a function of a particular point in time on the timeline represented by a multi-track sequence. In an example embodiment, the audio mix processing map is a directed graph with a node chain representing each track item, defined edits to that track item (e.g., a clip node that represents a particular audio clip, followed by an edit node for each audio edit applied to the audio clip), followed by a mix node that represents the audio track processing that mixes a corresponding audio tracks into the final output. In some embodiments, the processing device compares the audio mix processing map generated in response to the update trigger to a previously generated representation, and if they are found to be equivalent (e.g., there is no change in the applicable metadata), the processing device determines that the update trigger did not have an impact on the mix output and terminates method 500 without proceeding to block 530. Otherwise, at block 530, the processing device generates aggregated transcript using the audio mix processing map.

Figure 6:
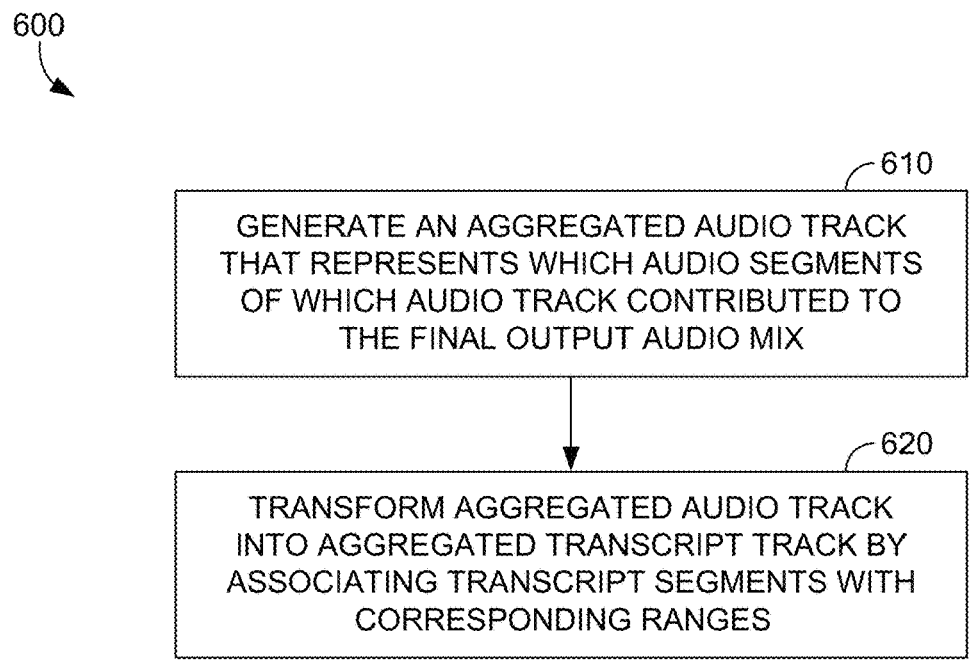
FIG. 6 is a flow diagram showing a method for generating an aggregated transcript track from an aggregated audio track, in accordance with certain embodiments.

FIG. 6 is a flow diagram showing a method 600 for generating an aggregated transcript track from an aggregated audio track, in accordance with certain embodiments. Method 600 represents a possible way of performing at least a portion of block 530 of method 500. Initially at block 610, a processing device implementing the present disclosure generates an aggregated audio track that represents which audio segments (of which track items) of which audio track contributed to the final audio mix. In an example embodiment, the processing device retrieves metadata for one or more audio sources (clips), defined edits, mix levels, and/or the like, evaluates the metadata against one or more contribution tracking rules to determine which portions of which track items are considered to have contributed to the final audio mix, and generates a representation of those contributing portions, such as an aggregated audio track (e.g., a linked list with different entries that represent the different contributing portions (contributing track items), and corresponding characteristics such as duration, start time, stop time). In some embodiments, the processing device compares the metadata retrieved at block 610 with a previously retrieved and cached version, and if they are found to be equivalent (e.g., there is no change in the applicable metadata), the processing device determines that the update trigger did not have an impact on the mix output and terminates method 600 without proceeding to block 620. Otherwise, at block 620, the processing device transforms the aggregated audio track into an aggregated transcript track by looking up and associating transcript segments from corresponding transcripts with corresponding ranges defined by the aggregated audio track.

Figure 7:
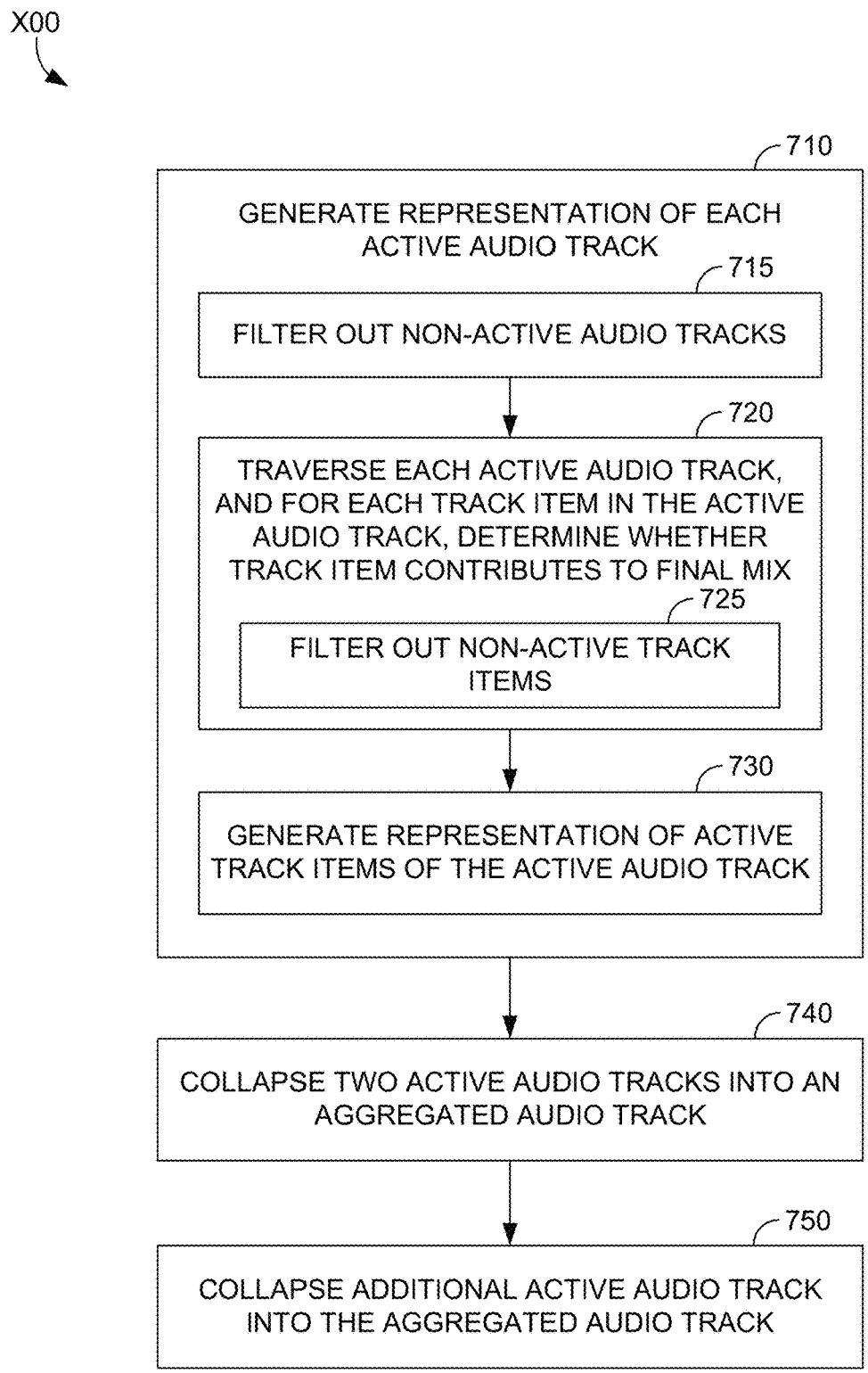
FIG. 7 is a flow diagram showing a method for generating an aggregated audio track, in accordance with certain embodiments.

FIG. 7 is a flow diagram showing a method 700 for generating an aggregated audio track, in accordance with certain embodiments. Method 700 represents a possible way of performing at least a portion of block 610 of method 600. Initially at block 710, a processing device implementing the present disclosure generates a representation of each active audio track. Blocks 715-730 represent a possible way of performing at least a portion of block 710. At block 715, the processing device filters out non-active audio tracks (e.g., by retrieving static track metadata and applying contribution tracking rules that operate on the static track metadata (e.g., filter out tracks that are muted or when another track is being soloed)). At block 720, the processing device traverses one or more active audio tracks, and for each track item in the one or more active audio tracks, determines whether the track item contributes to the final mix (e.g., by retrieving static track item metadata and applying contribution tracking rules that operate on the static track item metadata (e.g., filter out track items that are muted)). In some embodiments, at block 725, the processing device filters out non-active track items (e.g., track items determined not to contribute to the final mix).

In some embodiments, in order to evaluate track and/or track item metadata against one or more contribution tracking rules (e.g., as in blocks 715, 720, and/or 725), the processing device queries one or more metadata side channels to retrieve an audio mix processing map for a given time on the timeline, where the audio mix processing map includes or identifies nodes that represent audio sources that are present at the given time, metadata representing their audio characteristics (e.g., volume, intensity, power), defined edits, and/or mix levels. As such, in some such embodiments, the processing device evaluates the audio mix processing map and/or some other representation of the applicable metadata against one or more contribution tracking rules to determine which track items do and/or do not contribute to the final mix. As such, at block 730, the processing device generates a representation of the active track items of the active audio track (e.g., a linked list with entries that represent the active track items and/or their characteristics such as duration, start time, stop time).

Block 710 serves to generate a representation of each active audio track in a multi-track sequence (e.g., N linked lists with each linked list representing track items or active track items in a corresponding audio track). In some embodiments, after execution of block 710, the processing device determines whether there is only one active audio track, and if so, method 700 terminates (e.g., proceeding to block 620 of method 600, transforming the single active audio track into a linear transcript). Otherwise, at block 740, the processing device collapses two active audio tracks into an aggregated audio track. In an example embodiment, the processing device creates an aggregated audio track including active track items from one of the active audio tracks, and iterates through a second active audio track, identifying and reconciling conflicts by applying contribution tracking rules that operate on dynamic track metadata, that operate on dynamic track item metadata, and/or that otherwise resolve conflicts (e.g., prioritizing tracks and/or track items with a higher position in the multi-track sequence, a higher volume level, etc.). In some such embodiments, after collapsing two active audio tracks into the aggregated audio track, at block 750, the processing device collapses an additional active audio track into the aggregated audio track. Block 750 is repeated until there are no more active audio tracks to collapse into the aggregated audio track.

Figure 8:
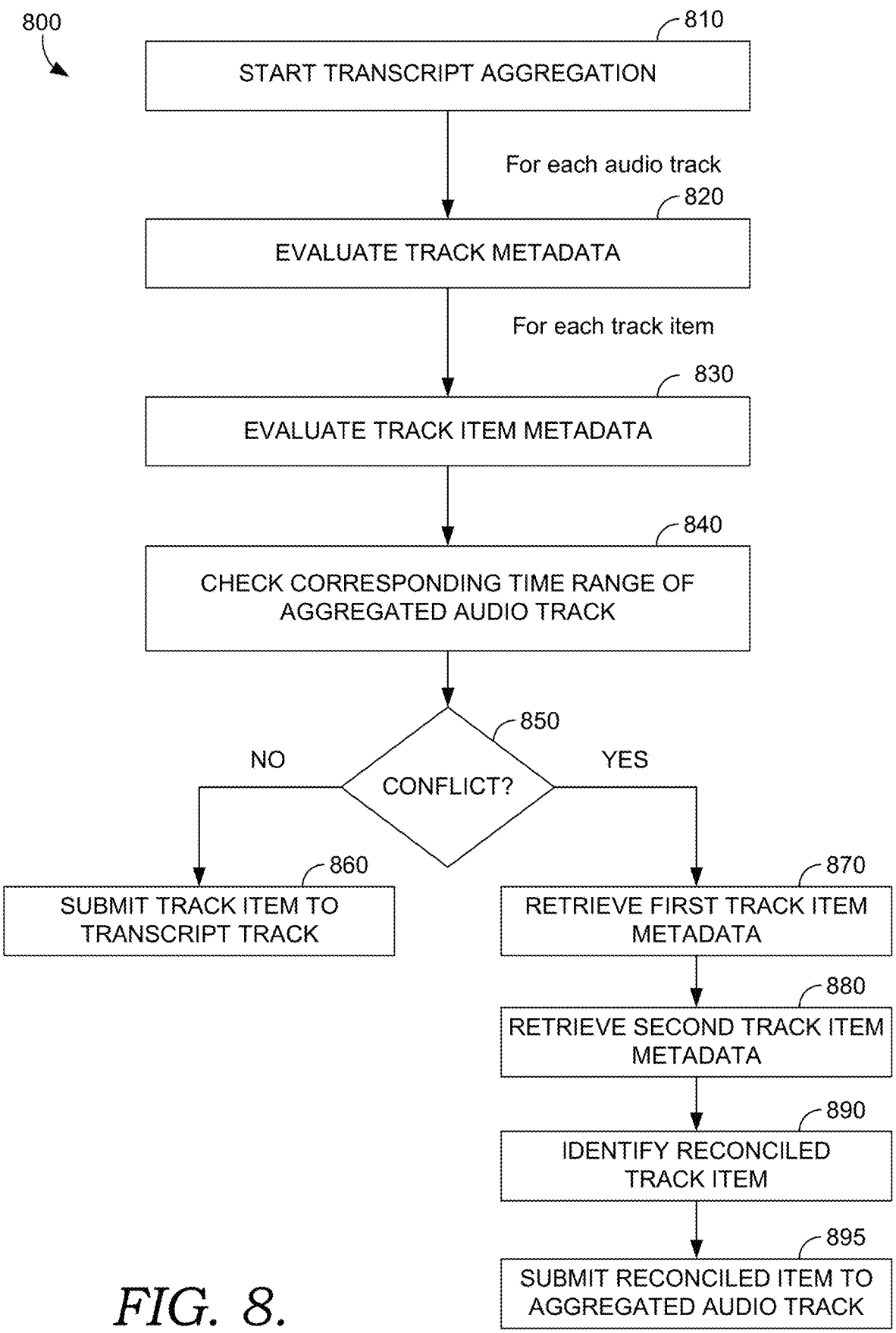
FIG. 8 is a flow diagram showing a method for collapsing two active audio tracks into an aggregated audio track, in accordance with certain embodiments.

FIG. 8 is a flow diagram showing a method 800 for collapsing two active audio tracks into an aggregated audio track, in accordance with certain embodiments. Method 800 represents a possible way of performing at least a portion of block 530 of method 500. Initially at block 810, a processing device implementing the present disclosure starts a transcript aggregation process (e.g., based on detecting a triggering event, such as creating a new project, editing a track item or audio track item, or duplicating a multi-track sequence within a project). At block 820, the processing device retrieves and evaluates track metadata for each audio track (e.g., to identify audio tracks that are and/or are not active). At block 830, for each track item in a particular (e.g., active) audio track, the processing device retrieves and evaluates track item metadata for that track item. In some embodiments, block 820 and/or 830 are performed in a process that generates a representation of each active audio track (e.g., N linked lists), and/or iterates through an audio track to initialize an aggregated audio track with contributing track items from the audio track. As such, blocks 840-895 represent a possible way to collapse another active audio track into the initialized aggregated audio track. Similarly, blocks 840-895 represent a possible way of performing at least a portion of block 740 of method 700 and/or block 750 of method 700.

At block 840, (e.g., for each active track item in an active track, for each track item that is in an active track and is determined to contribute at least in part to a final mix), the processing device identifies the time range that the track item is active and checks the aggregated audio track to determine whether there is another track item in the aggregated audio track during that time range. At block 850, the processing device determines whether there is a conflict (e.g., an overlap between the active track item from the audio track and an existing track item in the aggregated audio track). If there is no conflict, at block 860, the processing device submits the active track item from the audio track to the aggregated transcript track.

If there is a conflict, method 800 advances to blocks 870 and 880, where the processing device retrieves the track item metadata for the two conflicting (overlapping) track items. At block 890, the processing device identifies a reconciled track item by applying one or more conflict tracking rules, and at block 895, the processing device submits the reconciled item to aggregated audio track. In some embodiments, the processing device identifies one of the two conflicting track items as the reconciled track item. In some embodiments, the processing device splits one or both of the conflicting track items and creates multiple reconciled track items representing different prioritized portions of the conflicting track items. For example, in some embodiments, if a first track item from a first audio track subsumes a second track item from the other audio track, there is only a conflict during a portion of the first track item, and the processing device determines to prioritize the second track item over the first during the conflict, the processing device splits the first track item into the portions where there is no conflict, those portions of the first track item are included (or remain) in the aggregated audio track, and the second track item is included in the aggregated audio track (e.g., overwriting the portion of the first track item where there was a conflict).

Example Operating Environment

Figure 9:
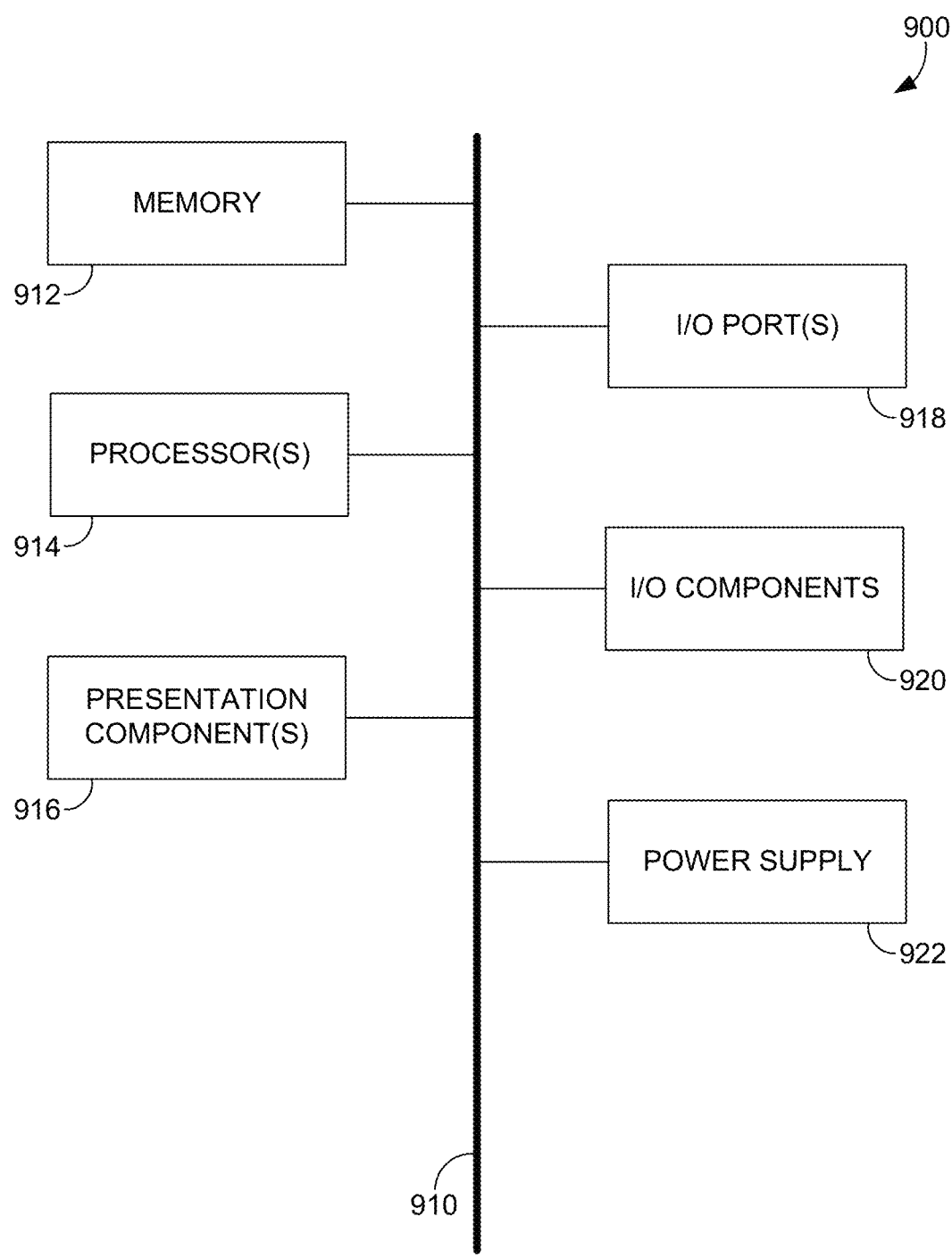
FIG. 9 is a block diagram of an example computing environment suitable for use in implementing certain embodiments.

Having described an overview of certain embodiments, an example operating environment in which some certain embodiments are implemented is described below in order to provide a general context for various aspects of the present invention. Referring now to FIG. 9 in particular, an example operating environment for implementing certain embodiments is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules (e.g., including or referencing routines, programs, objects, components, libraries, classes, variables, data structures, etc.) refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in some cases, it is not possible to delineate clear boundaries for different components. In this case, metaphorically, the lines would be grey and fuzzy. As such, the diagram of FIG. 9 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 9 and a "computing device."

Computing device 900 typically includes a variety of computer-readable media. Computer-readable media can be any available media that can be accessed by computing device 900 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 900 includes one or more processors that read data from various entities such as memory 912 or I/O components 920. Presentation component(s) 916 present data indications to a user or other device. Example presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 900. In some cases, computing device 900 is equipped with depth cameras, such as stereoscopic camera systems, infrared camera systems, RGB camera systems, touchscreen technology, and combinations of these, for gesture detection and recognition. Additionally or alternatively, the computing device 900 is equipped with accelerometers or gyroscopes that enable detection of motion, and in some cases, an output of the accelerometers or gyroscopes is provided to the display of computing device 900 to render immersive augmented reality or virtual reality.

Embodiments described herein support transcript aggregation. The components described herein refer to integrated components of a transcript aggregation system. The integrated components refer to the hardware architecture and software framework that support functionality using the transcript aggregation system. The hardware architecture refers to physical components and interrelationships thereof and the software framework refers to software providing functionality that can be implemented with hardware embodied on a device.

In some embodiments, the end-to-end software-based system operates within the components of the transcript aggregation system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with certain embodiments.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when executed by one or more processing devices, cause the one or more computing processing to perform operations comprising:
generating an audio mix processing map comprising a plurality of volume levels corresponding to a plurality of audio sources of a multi-track sequence;
generating a plurality of transcripts, comprised of text data, corresponding to the plurality of audio sources;
generating, using the audio mix processing map, an aggregated audio track that represents which of the plurality of audio sources contribute to a final mix during which ranges of time; and
based on comparative volume levels of the plurality of audio sources included in the aggregated audio track, transforming the aggregated audio track into an aggregated transcript track by selectively associating transcript segments from the plurality of transcripts with corresponding ranges of the ranges of time, from audio sources having a comparative volume level above a threshold.

2. The one or more non-transitory computer storage media of claim 1, wherein a first volume of the plurality of volume levels corresponding to a first audio source of the plurality of audio sources that is above the threshold and a first transcript segment associated with the first audio source is included in the aggregated transcript track.

3. The one or more non-transitory computer storage media of claim 2, wherein the operations further comprise:
determining that a second volume of the plurality of volume levels corresponding to a second audio source of the plurality of audio sources is below the threshold; and
based on determining that the second volume is below the threshold, excluding a second transcript segment associated with the second audio source-is from the aggregated transcript track.

4. The one or more non-transitory computer storage media of claim 1, the operations further comprising:
receiving an edit to a first audio source of the plurality of audio sources, the edit reducing a volume level of the first audio source below the threshold; and
updating the aggregated transcript track to remove a transcript segment associated with the first audio source from the aggregated transcript track.

5. The one or more non-transitory computer storage media of claim 1, wherein transforming the aggregated audio track into the aggregated transcript track further comprises:
determining that a range of at least a first transcript of the plurality of transcripts overlaps with a range of at least a second transcript of the plurality of transcripts, wherein the first audio source has a first volume level that is lower than a second volume level of the second audio source; and
omitting a transcript segment associated with the first audio source from the aggregated transcript track.

6. The one or more non-transitory computer storage media of claim 1, wherein generating the aggregated audio track comprises determining whether a particular audio source of the plurality audio sources contributes to the final mix by evaluating metadata represented by the audio mix processing map against one or more contribution tracking rules.

7. The one or more non-transitory computer storage media of claim 1, wherein generating the aggregated audio track comprises applying one or more contribution tracking rules that evaluate at least one of track mute status, track solo status, volume automation, track item volume, track item gain, or track item classification against metadata represented by the audio mix processing map.

8. The one or more non-transitory computer storage media of claim 1, the operations further comprising transcribing the plurality of audio sources upon importing into the multi-track sequence or in response to a permissions change, wherein transforming the aggregated audio track into the aggregated transcript track is without re-transcribing the plurality of audio sources.

9. The one or more non-transitory computer storage media of claim 1, wherein generating the aggregated audio track comprises determining that a signal level for an audio source of the plurality of audio sources falls below a threshold level during a time range, and transforming the aggregated audio track into the aggregated transcript track excludes from the aggregated transcript track a portion of a transcript of the audio source corresponding to the time range in which the signal level falls below the threshold level.

10. The one or more non-transitory computer storage media of claim 1, the operations further comprising causing an interface of a video or audio editor to present a representation of the transcript segments of the aggregated transcript track or executing a keyword search against the transcript segments of the aggregated transcript track.

11. A method comprising:
generating an audio mix processing map comprising a plurality of volume levels corresponding to a plurality of audio track items;
generating a plurality of transcripts, comprised of text data, corresponding to the plurality of audio sources;
generating, using the audio mix processing map, an aggregated audio track that represents which of the plurality of audio track items contribute to a final mix during which ranges of time; and
based on comparative volume levels of the plurality of audio sources included in the aggregated audio track, transforming the aggregated audio track into an aggregated transcript track by selectively associating transcript segments from the plurality of transcripts with corresponding ranges of the ranges of time, from audio sources having a comparative volume level above a threshold.

12. The method of claim 11, wherein the audio mix processing map is a directed graph with a clip node that represents an audio track item of the audio track items present at a particular time and a map of duration of the audio track item versus volume.

13. The method of claim 11, wherein the audio mix processing map is a directed graph with an edit node that represents edits applied to an audio track item of the audio track items present at a particular time as a map of keyframes of the audio track item versus volume.

14. The method of claim 11, wherein generating the aggregated audio track comprises generating or updating a linked list with entries that represent the contributing audio track items and the corresponding ranges.

15. The method of claim 11, further comprising detecting an edit to one of the audio track items, wherein generating the aggregated audio track and transforming the aggregated audio track into the aggregated transcript track are in response to detecting the edit.

16. The method of claim 11, wherein generating the aggregated audio track comprises determining whether a particular audio track item of the audio track items contributes to the final mix by evaluating metadata represented by the audio mix processing map against one or more contribution tracking rules.

17. The method of claim 11, wherein generating the aggregated audio track comprises applying one or more contribution tracking rules that evaluate at least one of track mute status, track solo status, volume automation, track item volume, track item gain, or track item classification against metadata represented by the audio mix processing map.

18. The method of claim 11, further comprising transcribing the audio track items in response to a permissions change, wherein transforming the aggregated audio track into the aggregated transcript track is without re-transcribing the audio track items.

19. The method of claim 11, wherein generating the aggregated audio track comprises determining that a signal level for an audio track item of the audio track items falls below a threshold level during a time range, and transforming the aggregated audio track into the aggregated transcript track excludes from the aggregated transcript track a portion of a transcript of the audio track item corresponding to the time range in which the signal level falls below the threshold level.

20. A system comprising one or more processors and memory configured to provide computer program instructions to the one or more processors, the computer program instructions comprising:
an aggregator configured to:
generate an audio mix processing map comprising a plurality of volume levels corresponding to a plurality of audio sources of a multi-track sequence;
generate a plurality of transcripts, comprised of text data, corresponding to the plurality of audio sources;
generate, using the audio mix processing map, an aggregated audio track that represents which of the plurality of audio sources contribute to a final mix during which ranges of time; and
based on comparative volume levels of the plurality of audio sources included in the aggregated audio track, transform the aggregated audio track into an aggregated transcript track by selectively associating transcript segments from the plurality of transcripts with corresponding ranges of the ranges of time, from audio sources having a comparative volume level above a threshold.

* * * * *